United States Patent
Schreter

(10) Patent No.: US 9,208,191 B2
(45) Date of Patent: Dec. 8, 2015

(54) LOCK-FREE, SCALABLE READ ACCESS TO SHARED DATA STRUCTURES

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 393 days.

(21) Appl. No.: 13/554,967

(22) Filed: Jul. 20, 2012

(65) Prior Publication Data

US 2014/0025651 A1    Jan. 23, 2014

(51) Int. Cl.
*G06F 17/30* (2006.01)
*G06F 12/02* (2006.01)

(52) U.S. Cl.
CPC ...... *G06F 17/30351* (2013.01); *G06F 12/0261* (2013.01); *G06F 17/30589* (2013.01)

(58) Field of Classification Search
USPC .......................................... 707/695, 692, 814
See application file for complete search history.

(56) References Cited

U.S. PATENT DOCUMENTS

| | | | |
|---|---|---|---|
| 5,280,612 A | 1/1994 | Lorie et al. | |
| 5,317,731 A | 5/1994 | Dias et al. | |
| 7,089,253 B2 * | 8/2006 | Hinshaw et al. | 707/703 |
| 7,395,383 B2 | 7/2008 | McKenney | |
| 7,581,066 B2 | 8/2009 | Marwinski et al. | |
| 7,640,249 B2 * | 12/2009 | Smits | 1/1 |
| 8,037,112 B2 | 10/2011 | Nath et al. | |
| 8,108,448 B2 | 1/2012 | Siegwart et al. | |
| 8,131,700 B2 * | 3/2012 | Zhu et al. | 707/705 |
| 8,412,688 B1 * | 4/2013 | Armangau et al. | 707/695 |
| 8,442,962 B2 | 5/2013 | Lee et al. | |
| 8,510,281 B2 | 8/2013 | Schwarzmann | |
| 2003/0182465 A1 | 9/2003 | Moir et al. | |
| 2006/0173885 A1 * | 8/2006 | Moir et al. | 707/101 |
| 2007/0233683 A1 | 10/2007 | Verma et al. | |
| 2011/0161603 A1 | 6/2011 | Taillefer | |
| 2011/0307450 A1 | 12/2011 | Hahn et al. | |
| 2012/0166407 A1 * | 6/2012 | Lee et al. | 707/703 |
| 2012/0197944 A1 * | 8/2012 | Foti | 707/798 |
| 2012/0254249 A1 | 10/2012 | Starkey | |
| 2013/0117247 A1 | 5/2013 | Schreter et al. | |
| 2013/0198139 A1 | 8/2013 | Skidanov et al. | |
| 2013/0290287 A1 * | 10/2013 | Shrinivas et al. | 707/705 |

OTHER PUBLICATIONS

U.S. Appl. No. 13/554,967, Schreter.

* cited by examiner

*Primary Examiner* — Sherief Badawi
*Assistant Examiner* — Christopher J Raab
(74) *Attorney, Agent, or Firm* — Mintz Levin Cohn Ferris Glovsky and Popeo, P.C.

(57) ABSTRACT

At least one read operation of at least one object of an object graph is initiated. For each corresponding read operation, a reference count of the root object is incremented (with the reference count 1 for the root object initially reflecting a single anchor pointer pointing to the root object). Subsequently, one or more of the objects are changed. Incompatible changes result in the root object, at least one changed object, and any intervening objects within the hierarchy of objects being cloned. The anchor pointer is then linked to the cloned root object. The root object is later dropped when the reference count for the root object is zero. In addition, the object graph is traversed starting at the root object and ending at the at least one changed object removing any edges for such objects. Each object having a reference count of zero is then dropped.

20 Claims, 15 Drawing Sheets

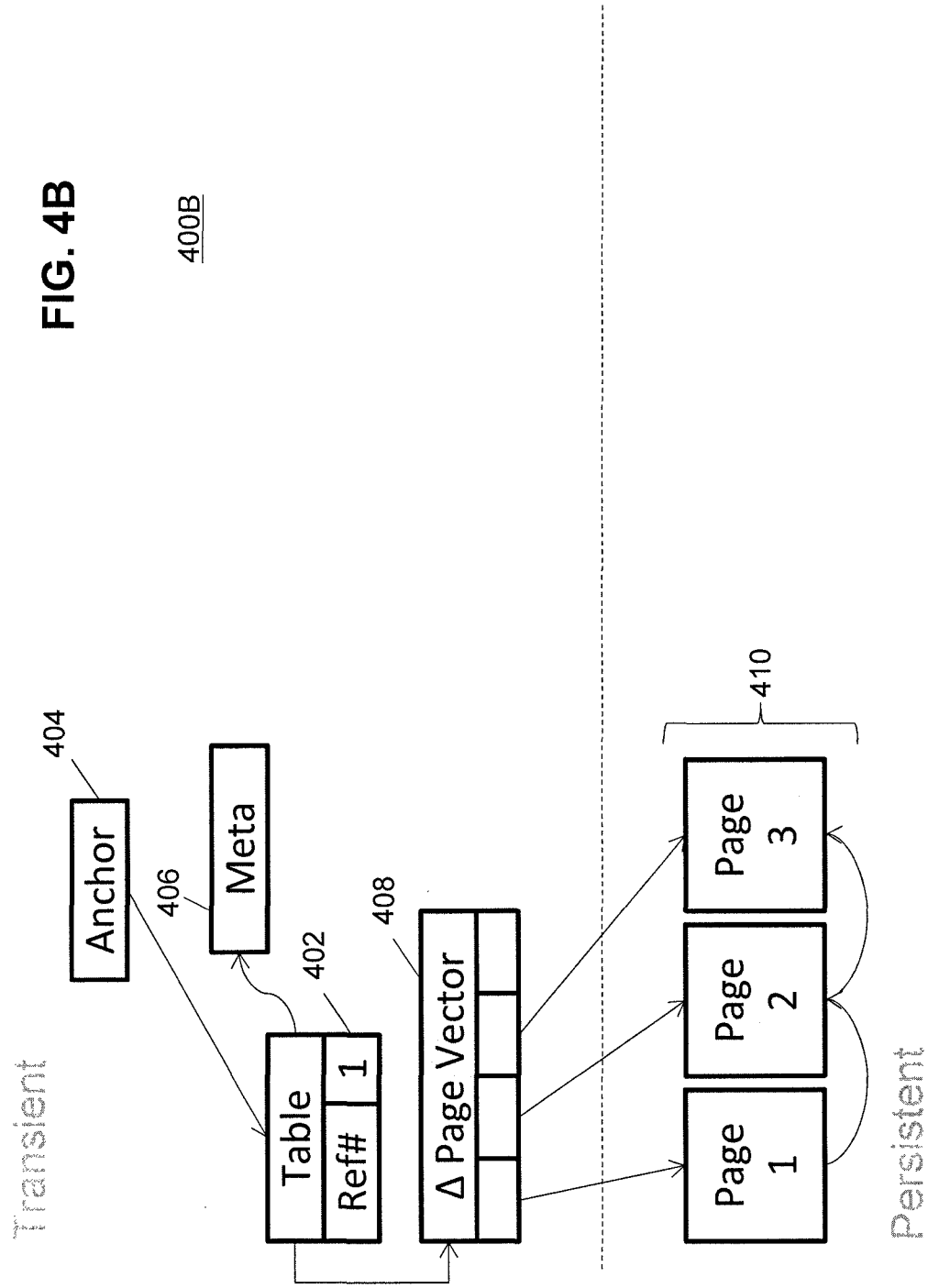

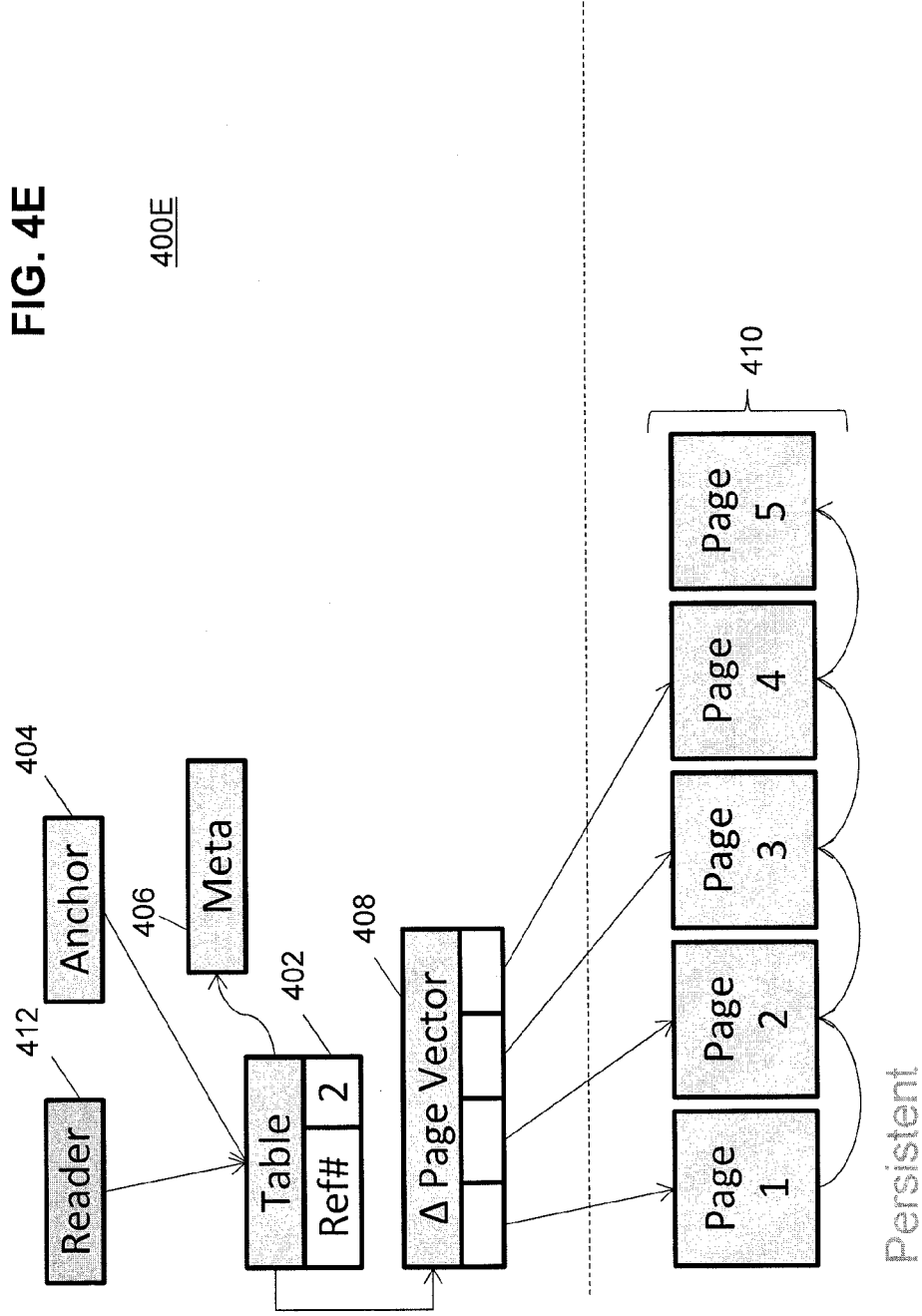

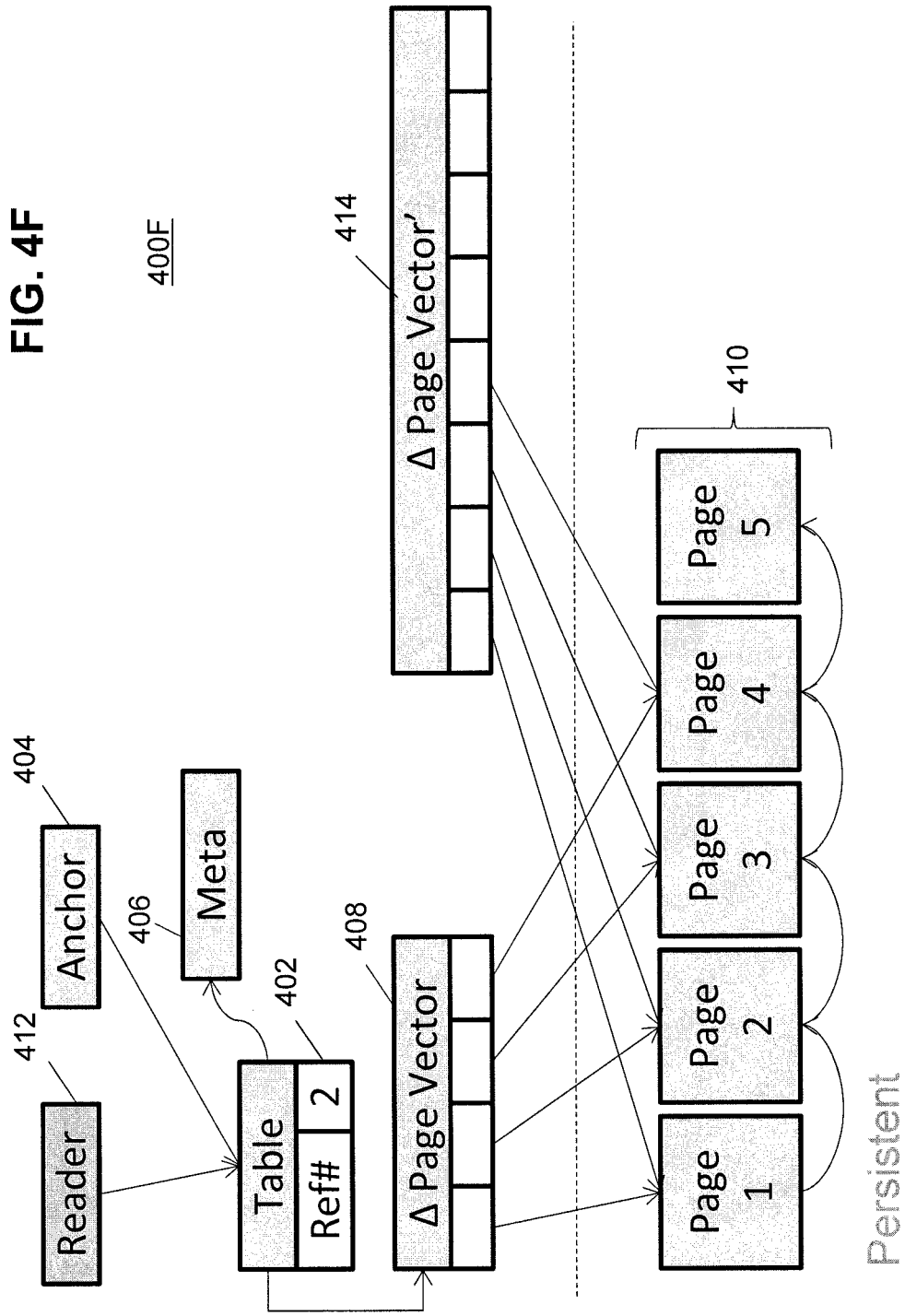

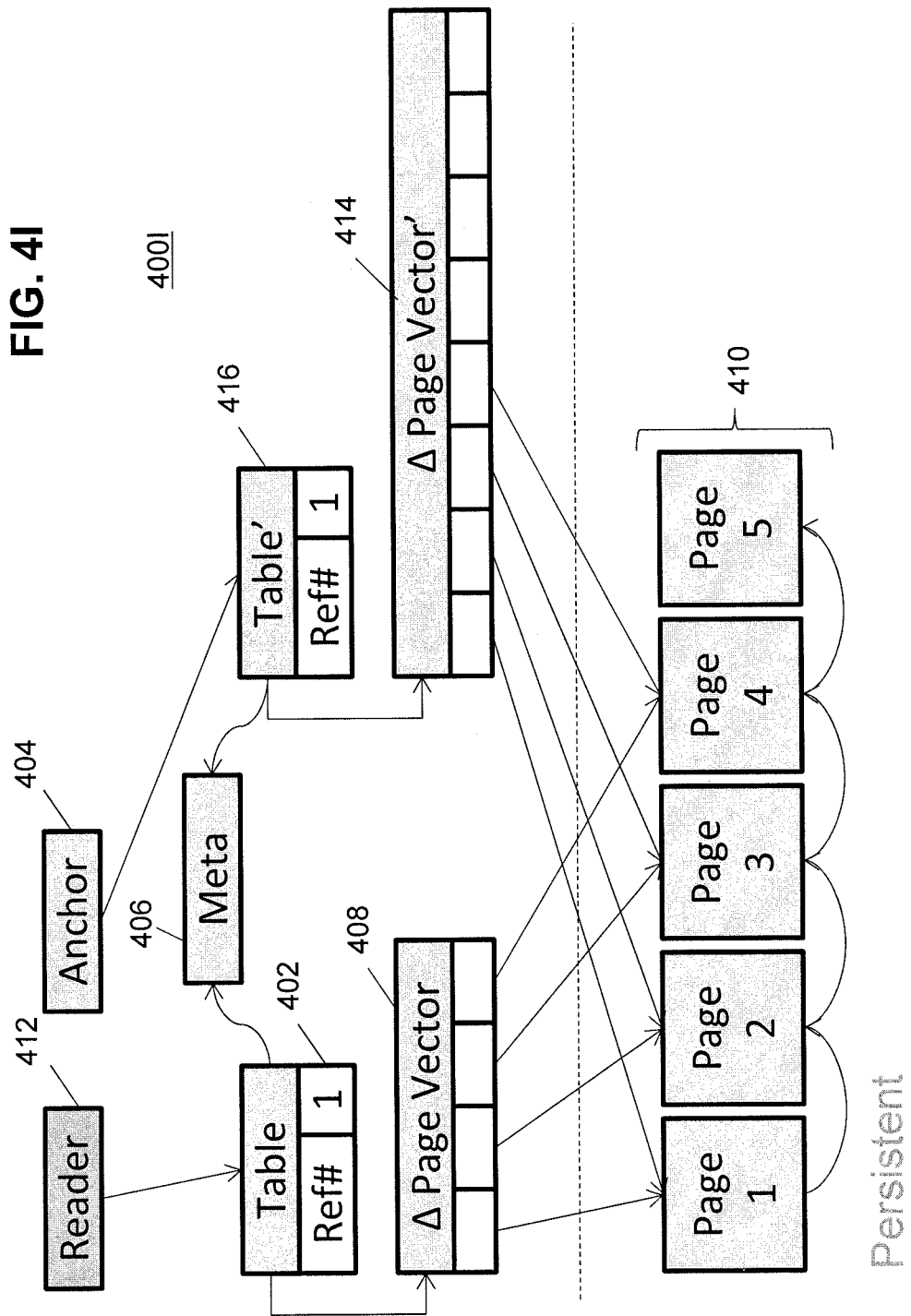

LOCK-FREE, SCALABLE READ ACCESS TO SHARED DATA STRUCTURES

TECHNICAL FIELD

The subject matter described herein relates to techniques providing lock-free and scalable read access to shared structures in a database kernel.

BACKGROUND

Synchronized access to shared data structures is required in many computer programs in order to ensure data consistency of those shared structures. In many cases, such shared structures are relatively seldom modified, but read quite often. In order to ensure data consistency, such structures can be locked using read/write locks that are exclusive for modification for the underlying data and are shared for reading operations. However, read/write locks are not particularly cheap synchronization primitives and even read access can cause L2-cache misses in the CPU, which in turn, can seriously limit performance of multiple-core computing systems.

Such problems can be alleviated but at the cost of (potentially much) higher memory usage for a single read/write lock. In particular, one memory cache line can be reserved for each CPU core so that shared locks in a corresponding core cache line can be counted when there is no exclusive lock request present.

However, with such an arrangement, at least two problems still remain. First, the exclusive access excludes reading of the shared structure until the corresponding operation is completed. This restriction can lead to performance bottlenecks, especially as modern many-core architectures now regularly exceed 100+CPU cores. In the context of in-memory databases, the problem is even more prominent, because there is no I/O time, which would dominate query execution time. Second, even with optimized read/write locks using one cache line per CPU core, heavy modification load will cause a high ratio of L2 cache misses during exclusive lock waiting. Ideally, shared readers should never be blocked by the modification of internal structures.

SUMMARY

In one aspect, at least one read operation of at least one object of an object graph is initiated. The object graph characterizes a hierarchy of objects including a root object in which at least a portion of the nodes have corresponding reference counts specifying a number of edges pointing to the associated object. Both compatible changes can be made to objects in the graph as well as incompatible changes. Thereafter, for each corresponding read operation, a reference count of the root object is incremented (with the reference count of 1 for the root object initially reflecting a single anchor pointer pointing to the root object). Subsequently, one or more of the objects are changed. Incompatible changes result in the root object, at least one changed object, and any intervening objects within the hierarchy of objects being cloned. The anchor pointer is then linked to the cloned root object. The root object is later dropped when the reference count for the root object is zero. In addition, the object graph is traversed starting at the root object and ending at the at least one changed object removing any edges for such objects. Each object having a reference count of zero is then dropped.

In some implementations, the reference counts can be striped across two or more CPUs. Such an arrangement is beneficial in that it reduces L-2 cache misses. Some or all of the objects can be stored in an in-memory database. The database can store data in rows with monotonically-increasing row identifiers. The database can use multi-version concurrency control.

In another aspect, a read operation of at least one page of a table is initiated. The read operation uses an anchor object pointing to a first table header object to access the at least one page. The first table header object includes a link to a first linked object that includes a handle to a plurality of pages including the at least one page. Thereafter, the linked object and the table header object are cloned concurrently with the read operation such that the cloned linked object includes handles to the plurality of pages including the at least one page. Subsequently, the anchor object is set to point to the cloned table header object. One additional page can be linked to the cloned linked object. Thereafter, the first table header object and the first linked object are dropped after the read operation is completed.

The tables can be stored in an in-memory database. The first linked object can be a versioned object comprising a reference count. The reference count forcing the in-memory database to maintain the first table header object and the first linked object during the read operations. The cloned table header object can initially be linked to the first linked object. The first table header object can have associated metadata characterizing the corresponding pages. The cloned table header object can also be associated with the metadata associated with the first table header object.

Non-transitory computer program products are also described that store computer executable instructions, which, when executed by one or more data processors of at least one computer, causes the at least one computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, with the current subject matter, read operations seeking to access a shared data structure are never blocked, so much better usage of CPU resources is possible, even under heavy table modification load.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 4A-4K are diagrams illustrating the creation and use of a cloned table header object and a cloned linked object to provide read access to a shared data structure during an incompatible modification.

DETAILED DESCRIPTION

Figure 1:
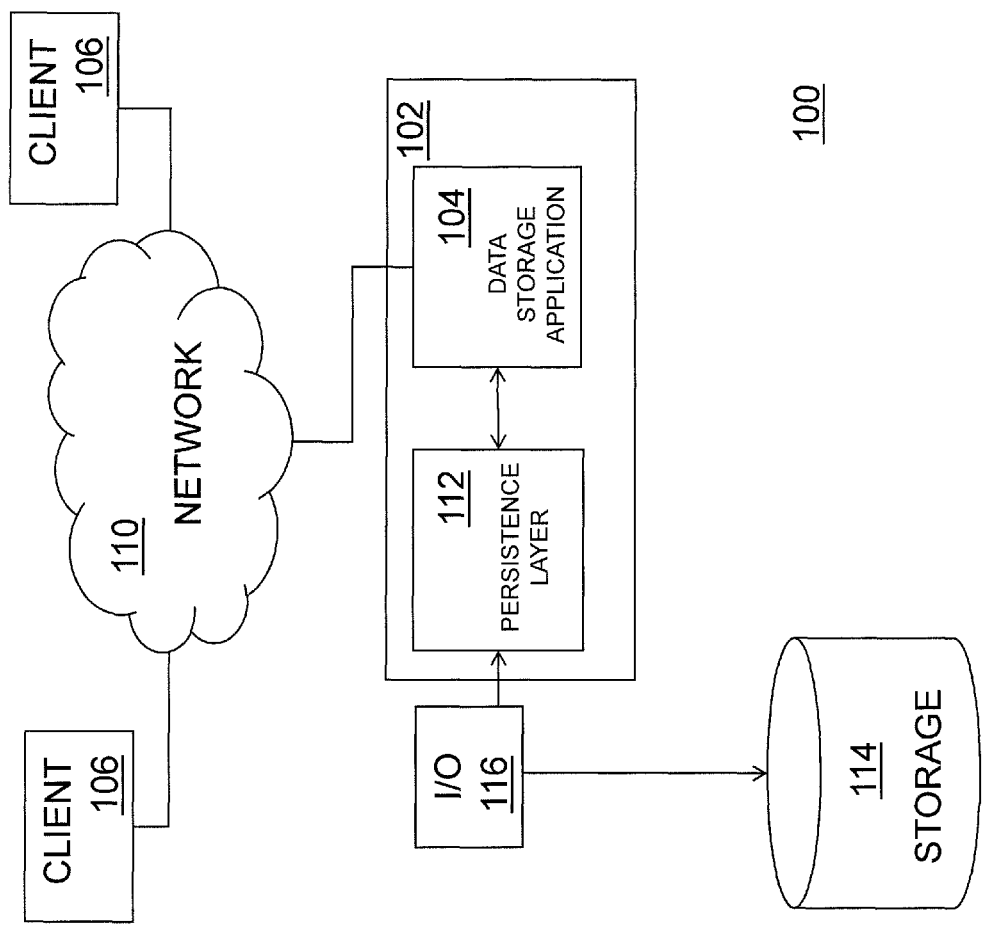
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2A:
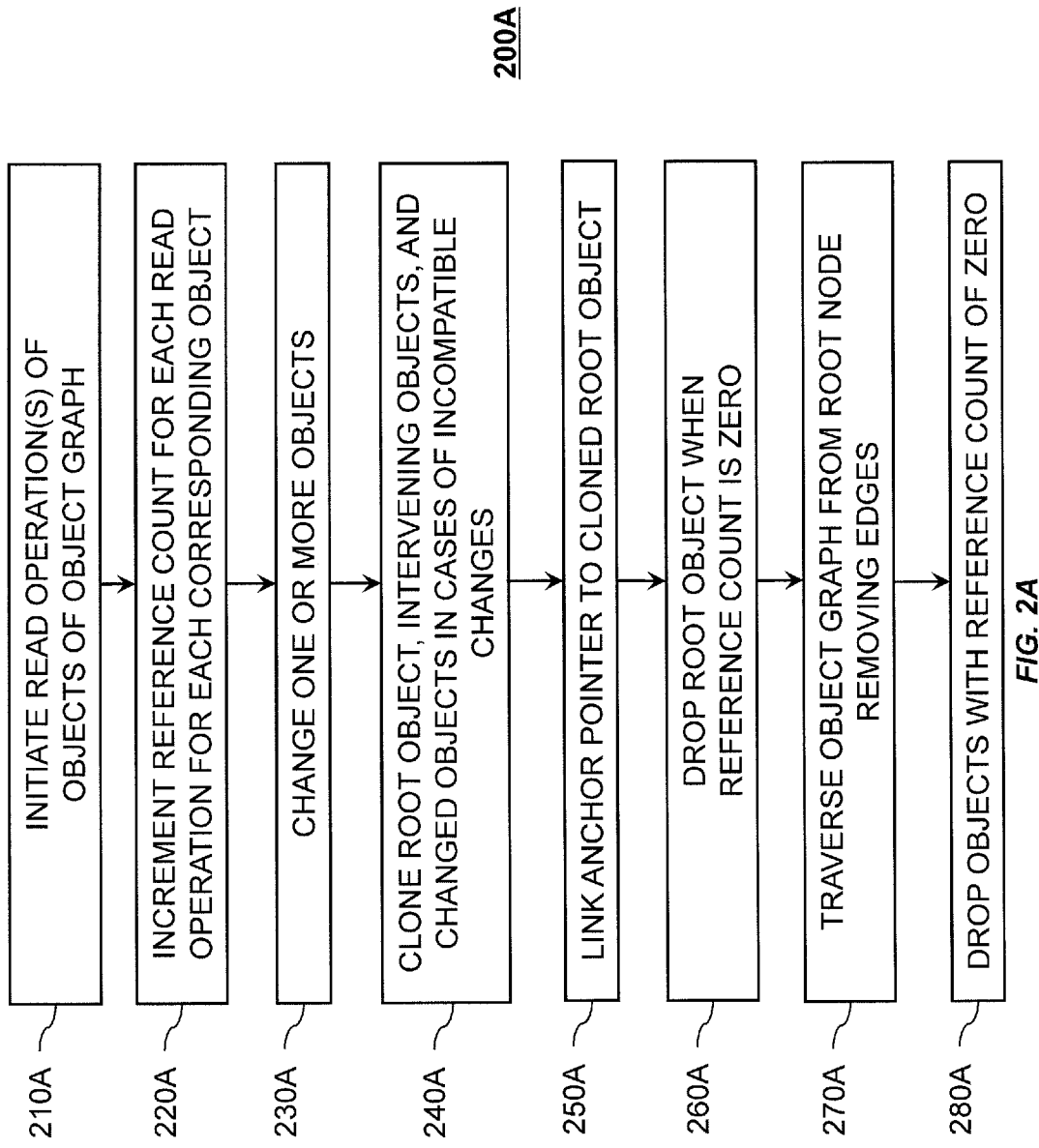
FIG. 2A is a first process flow diagram illustrating lock-free scalable access to a data structure.

FIG. 2A is a process flow diagram illustrating a method 200A in which, at 210A, at least one read operation of at least one object of an object graph is initiated. The object graph characterizes a hierarchy of objects including a root object in which at least a portion of the nodes have corresponding reference counts specifying a number of edges pointing to the associated object. Both compatible changes can be made to objects in the graph as well as incompatible changes. Thereafter, at 220A, for each corresponding read operation, a reference count of the corresponding object is incremented (with the reference count for the root object initially reflecting an anchor pointer pointing to the root object). Subsequently, at 230A, one or more of the objects are changed. Incompatible changes result, at 240A, in the root object, at least one changed object, and any intervening objects within the hierarchy of objects being cloned. The anchor pointer is then linked, at 250A, to the cloned root object. The root object is later dropped, at 260A, when the reference count for the root object is zero. In addition, the object graph is traversed, at 270A, starting at the root object and ending at the at least one changed object removing any edges for such objects. Each object having a reference count of zero is then dropped.

Figure 2B:
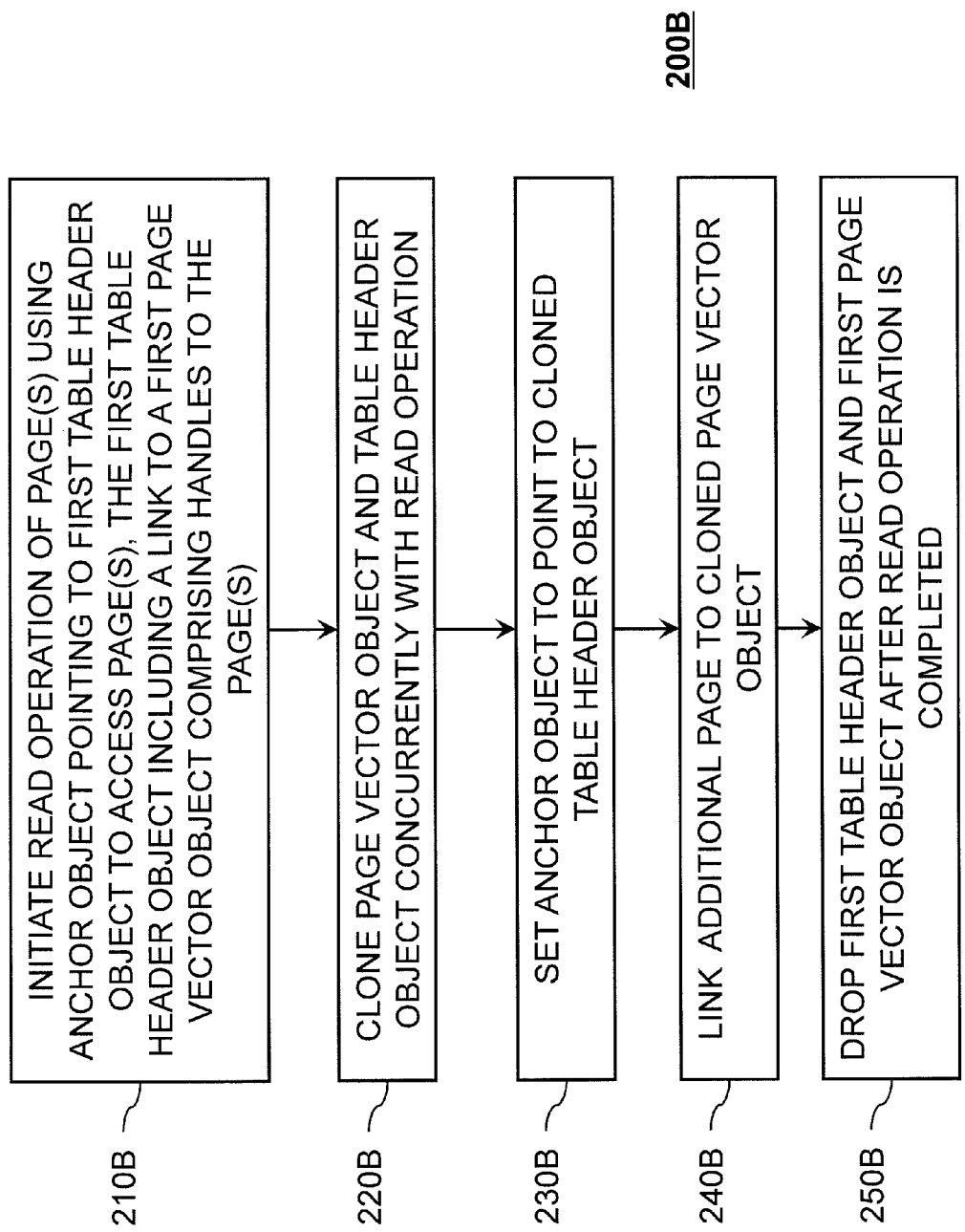
FIG. 2B is a second process flow diagram illustrating lock-free scalable access to a data structure.

FIG. 2B is a process flow diagram 200B in which, at 210B, a read operation of at least one page of a table stored in memory of an in-memory database is initiated. The read operation uses an anchor object pointing to a first table header object to access the at least one page. The first table header object includes a link to a first linked object that includes a handle to a plurality of pages including the at least one page. Thereafter, at 220B, the linked object and the table header object are cloned concurrently with the read operation. The cloned linked object includes handles to the plurality of pages including the at least one page. Next, at 230B, the anchor object is set to point to the cloned table header object and, at 240B, at least one additional page is linked to the cloned linked object. Subsequently, at 250B, the first table header object and the first linked object are dropped after the read operation is completed.

Stated differently, a read operation starts with root object (alias header object) of the object graph (in one example, it is the table header) and adds one (virtual) reference to this object. In this object graph (which is a directed graph), one can have further objects, which are linked to via references from other objects. Normally, this graph is a tree (i.e., no cycles). Objects are nodes/vertices of the graph, references are the edges (directed). Each reference to an object somewhere in the graph is counted, so reference count of the object is the number of edges pointing to this particular object. Reference count of the root is one (for the anchor) plus number of readers. This reference count is actually stored specially (striped over CPU cores) in order to prevent L2-cache conflicts.

A compatible change does not change the graph or reference counts, just one of the objects in the graph is changed. Incompatible changes will clone the affected object and any objects up to the root of the graph (including root/header object), creating new edges between those affected objects and also new edges between newly cloned objects and originally linked objects from old version of the respective object (increasing reference counts in process). All the other objects remain the same, and are re-linked from the original object graph (i.e., as a result, there will be a graph with two roots— original root/header object and a cloned one). When the anchor reference is transferred to the cloned one, the original root object loses a reference. When there is no reader, reference count drops to zero, which means this object will be removed. Transitively, the edges starting from this object are also removed, which leads to decrementing reference count of linked objects and eventually their removal. This continues until there is nothing to remove. When a reader is present, it still holds a reference to the original root/header object, so the whole process only happens after the last reader is finished.

Figure 3:
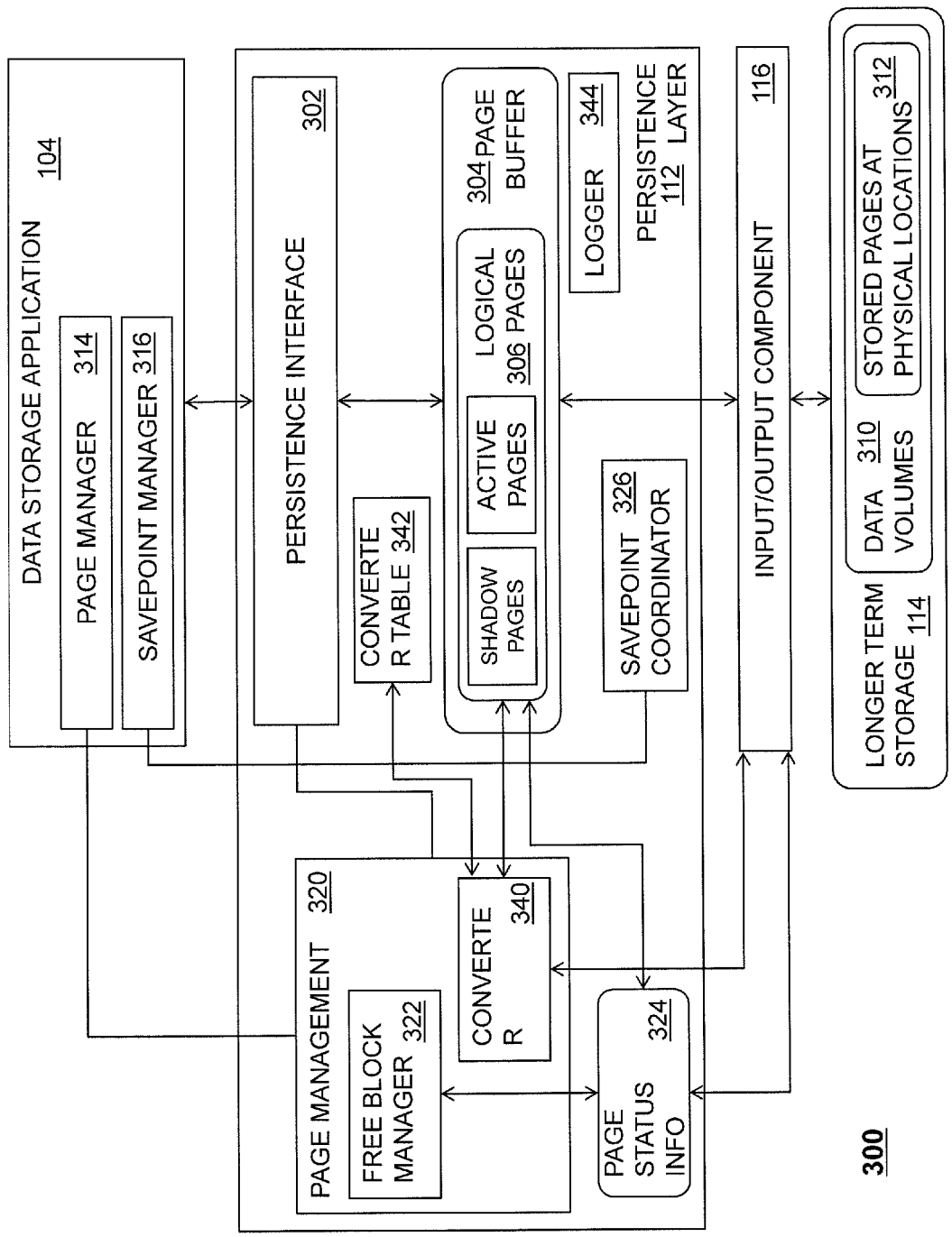
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages, active pages, and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 344 can write a database log (or simply referred to herein as a "log") sequentially into a memory buffer in natural order (e.g., sequential order, etc.). If several physical hard disks/storage devices are used to store log data, several log partitions can be defined. Thereafter, the logger 344 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 316 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit).

References herein to pages can refer to pages of a table stored in memory of an in-memory database forming part of the data storage application 104. With the MVCC-based database table implementation, all internal transient data objects of a table can be versioned. These data objects can include table a header object, metadata object(s), other internal state (s) such as vector of loaded pages, dictionary hashes/trees for compressed columnar tables, and the like.

With the current subject matter, all table control structures used by readers can be versioned. These structures include, for example, page lists, value indirection vectors, internal metadata, and more. Readers do not acquire any locks on data structure, but rather, work with a current version of a data structure until query or query plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.). Moreover, with some implementations, if older versions of prioritized/big objects (e.g., main part of a columnar table, etc.) still exist, no new version of the corresponding object can be created. For example, if there is a reader doing a scan on the main part of a columnar table, which started during columnar table merge from version n−1 to version n, this scan uses main part in version n−1. Even after merge to version n is finished, further merge from version n to version n+1 will be prevented as long as there are any scans running on main part in version n−1 (as this might increase memory demand prohibitively).

The following makes references to the diagrams 400A-400K illustrated in FIGS. 4A-4J. The objects representing a table in memory can be organized in a tree, which is rooted at table header object 402 and pointed to by an anchor pointer 404. The anchor pointer 404 is used to point to the root object of the table. The table header object, like all versioned objects, has a reference count. In the diagram 400A of FIG. 4A, the reference count is 1. Metadata 406 can characterize various aspects about the table represented by header object 402 (i.e., to define table columns and their data types, constraints, etc.). The table links to a page vector object 408 that in turn links (via page handles) to a plurality of pages $410_1 \ldots n$ (in this example it is linked to a first page $410_1$ and a second page $410_2$) of an in-memory table loaded in memory. Page handles are a special type of pointer pinning the loaded page in memory. With the current arrangement, a modification to the internal structure can be always synchronized against concurrent access by some means such as a mutex lock or in a more complex implementation by executing all modification operations in a single worker of a message-passing subsystem.

It will be appreciated that the current subject matter can be utilized in connection with a variety of different objects and that page vector objects are used as one of many implementations. For example, the current subject matter can be applied to object such as dictionary value vectors, dictionary hash and/or search tree, various metadata objects, etc. In addition, for page vectors, there can be one page vector for a delta part of the table and one for deltas written during a running merge operation. There can also be several page vectors for main part columns (or several compressed vectors in linear space).

There are in general two types of modifications, namely compatible modifications and incompatible modifications. An example of compatible modification would be to add a new page handle to a page vector holding all pages of an in-memory table loaded in memory, as long as the vector does not have to be resized.

The current subject matter addresses incompatible modifications. With reference again to the diagram 400A of FIG. 4A, the page vector 408 is sized to link to up to four pages. Adding a third page $410_3$ (as illustrated in the diagram 400B of FIG. 4B) does not require a resizing of the page vector 408. Changes to the data structure result in a third page $410_3$ being added. This third page $410_3$ is then linked to the page vector 408 and the reference in the table header object is incremented to 2 to reflect the new version of the header table object 402. Thereafter, as part of a read operation, with reference to the diagram 400C of FIG. 4C, a reader 412 is started that accesses the table header object 402 to identify the locations in memory of one or more of the linked pages $410_1 \ldots 3$.

Figure 4A:
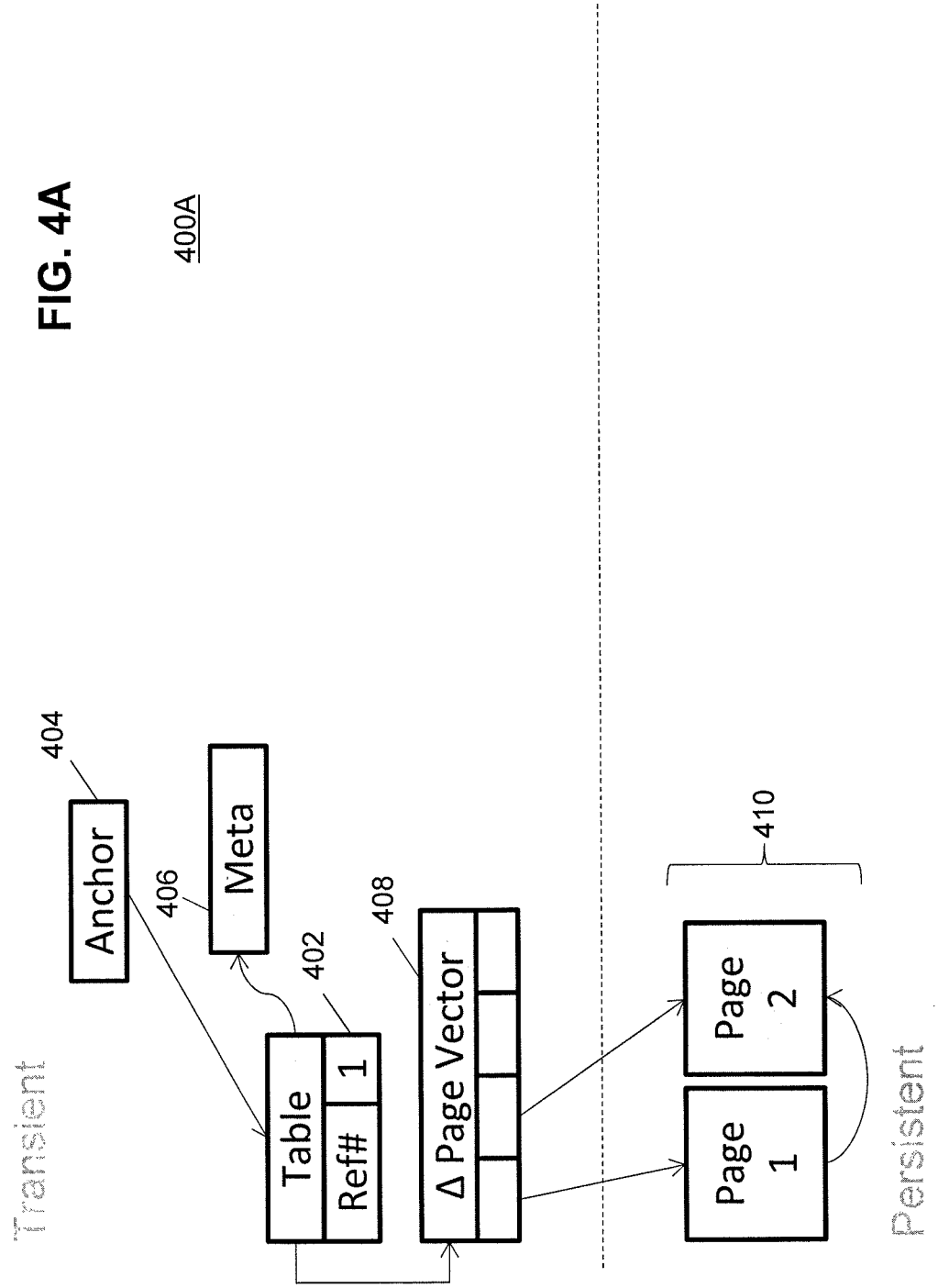
Figure 4C:
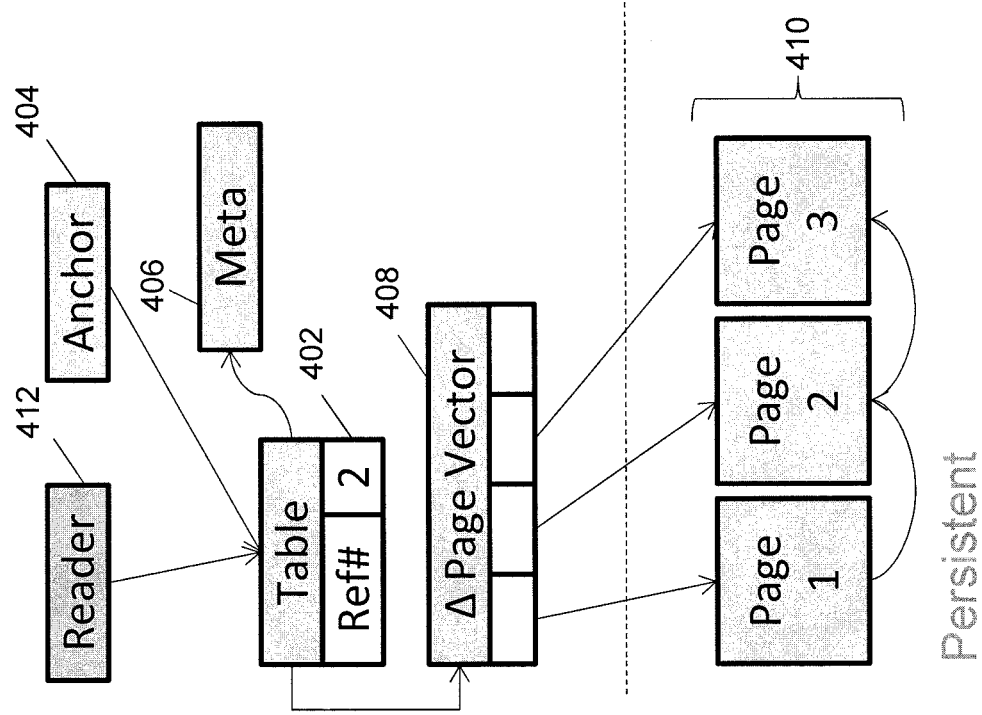
Figure 4D:
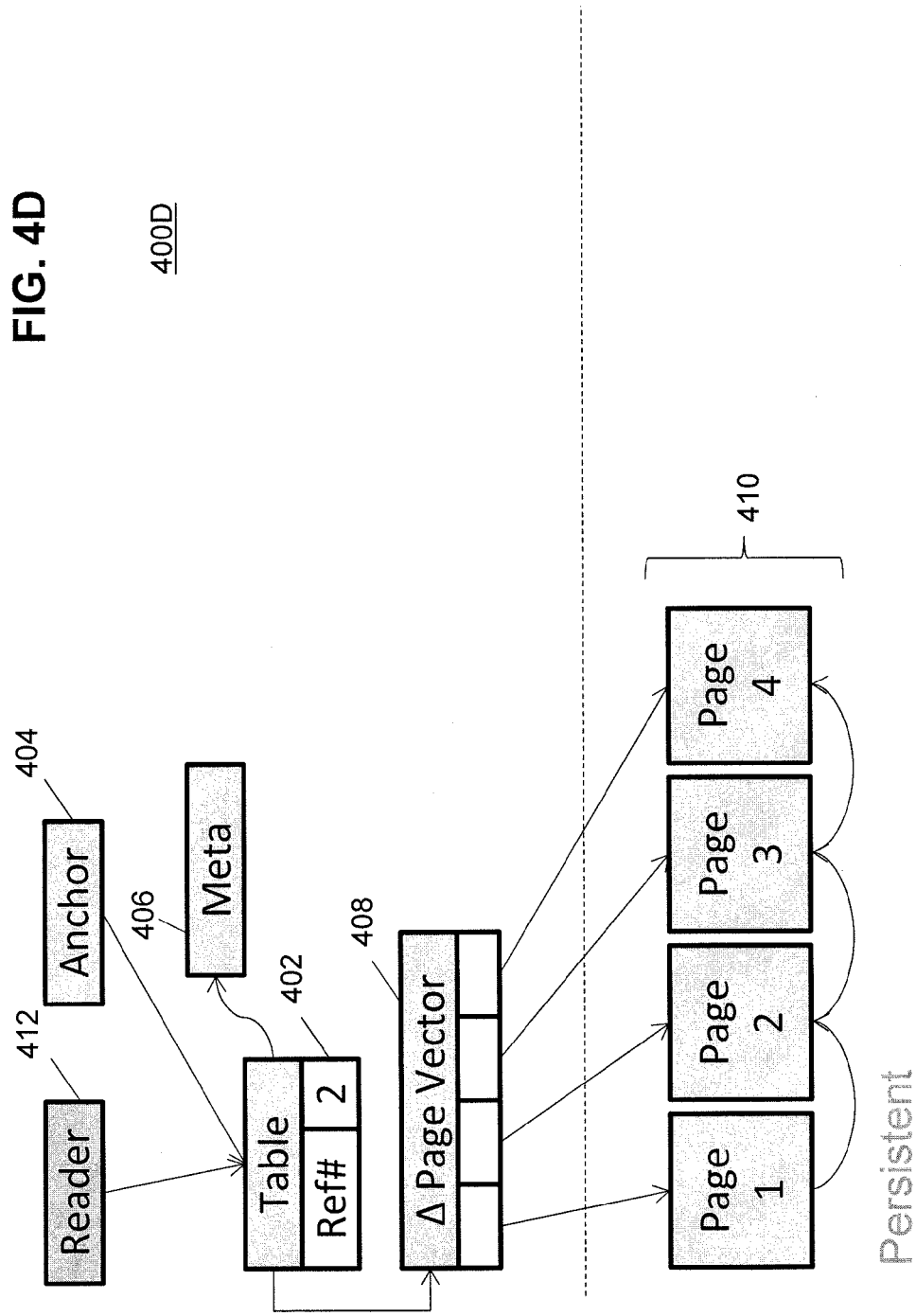
Figure 4G:
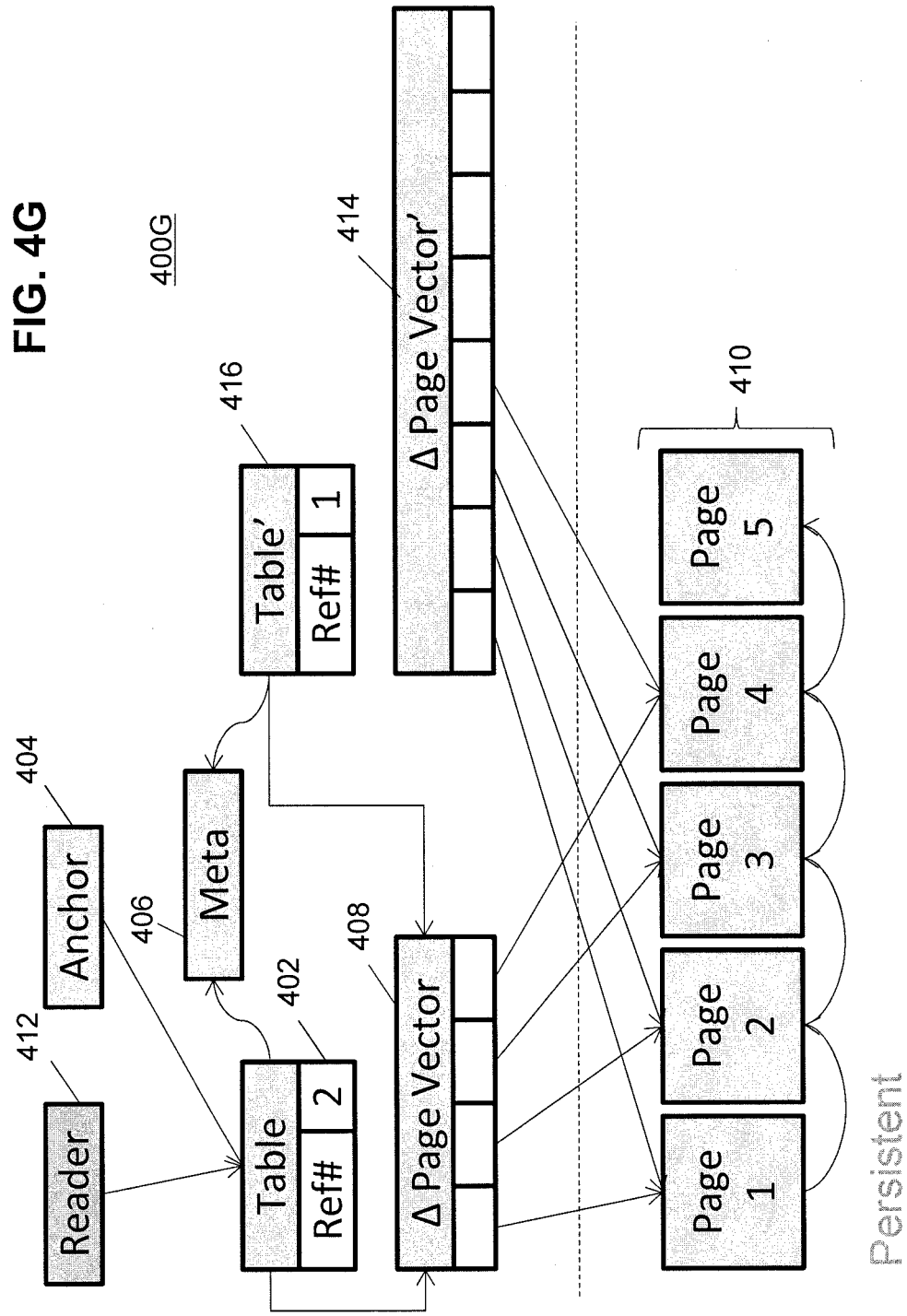
Figure 4H:
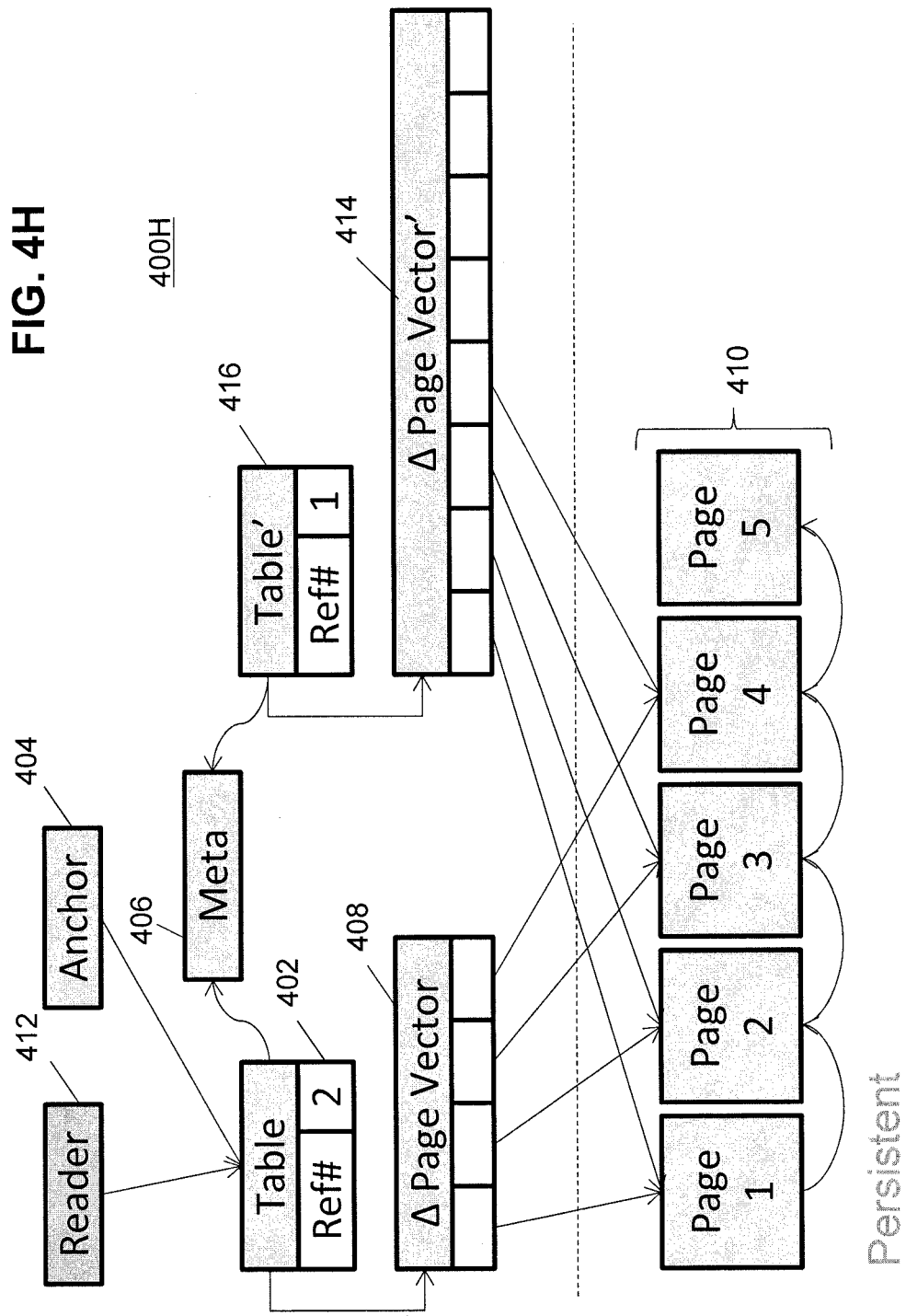
Figure 4J:
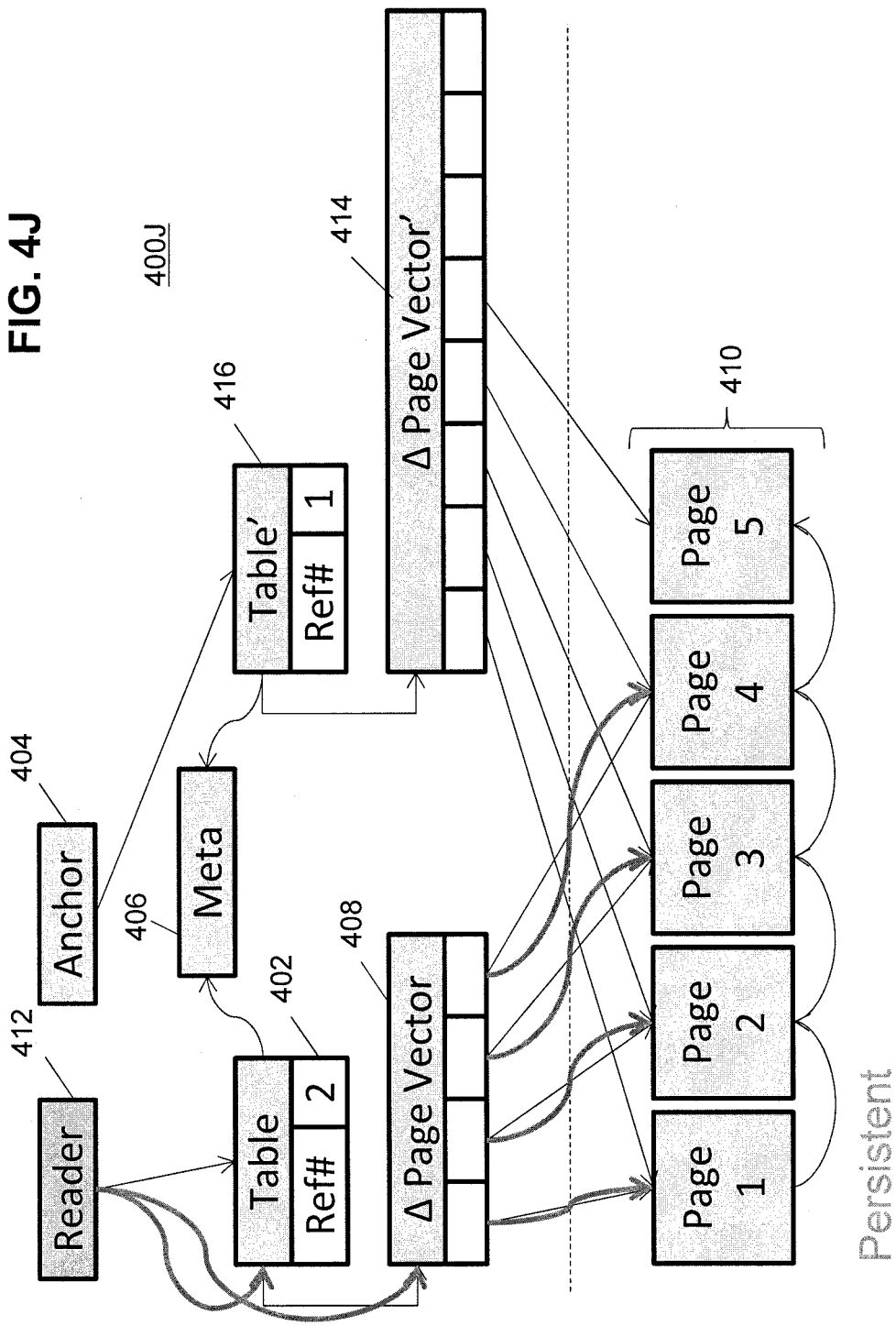

With reference to the diagram 400D of FIG. 4D, changes to the data structure then result in a fourth page $410_4$ being added. This fourth page $410_4$ is then linked to the page vector 408. Subsequently, as shown in FIG. 4E, changes to the data structure then result in a fifth page $410_5$ being added. In this case, the page vector 408 does not have space for a handle to the fifth page $410_5$. In order to accommodate the fifth page $410_5$ the page vector 408 is cloned/copied into a clone page vector 414 (as shown in diagram 400F of FIG. 4F) with handles to the first four pages $410_1 \ldots 4$. In addition, with reference to the diagram 400G of FIG. 4G, the table header object 402 is cloned into a clone table header object 416, and with reference to the diagram 400H of FIG. 4H, the cloned table header object 416 is updated to point from the original page vector 408 to the cloned page vector object 414.

Figure 4K:
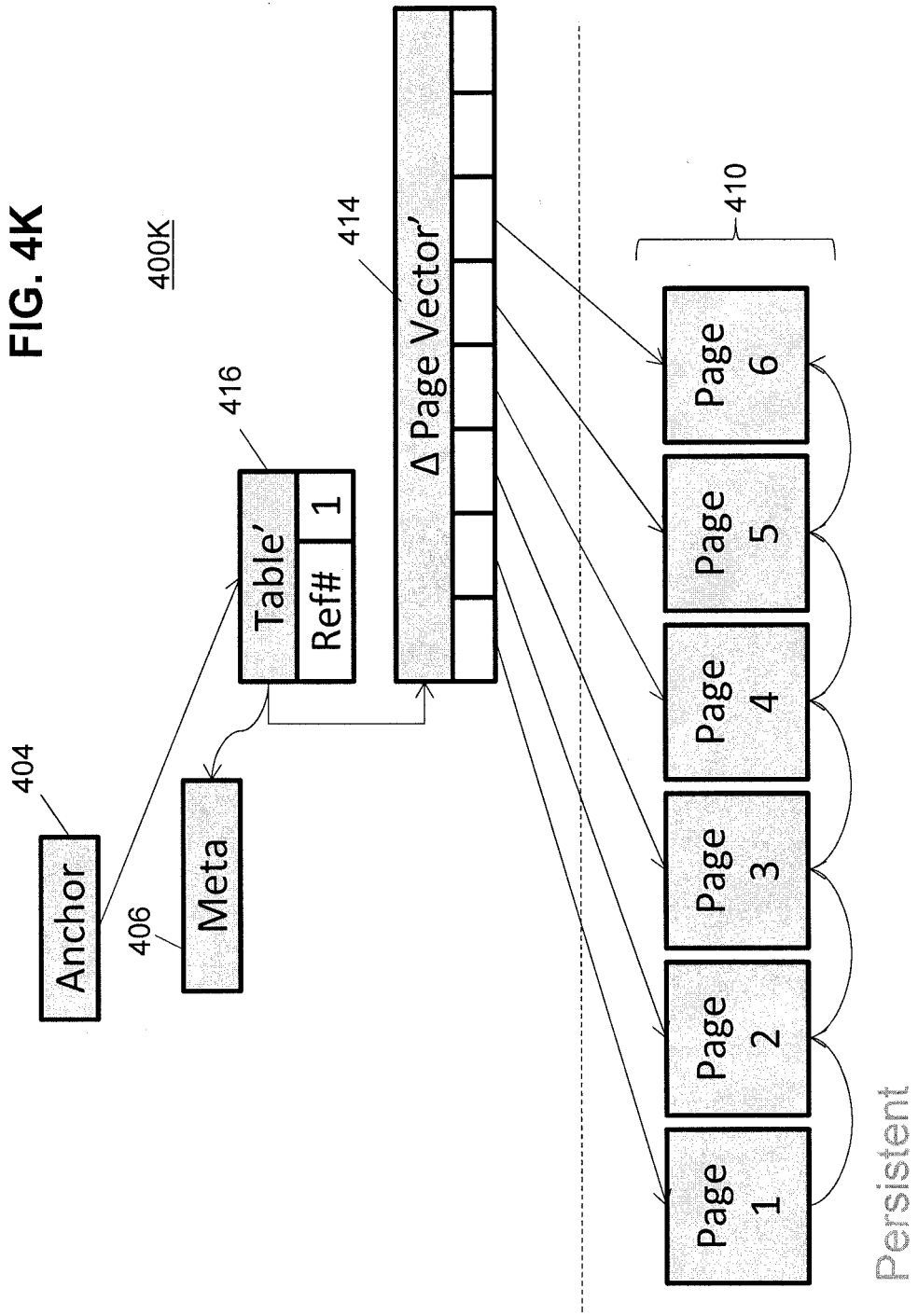

Next, with reference to the diagram 400I of FIG. 4I, the anchor pointer object 404 is set to the cloned table header object 416 and the reference number of the cloned table header object 416 is incremented from zero to one and the reference number of the original table header object 404 is decremented from two to one (because the reference from the anchor to the original table header was dropped and a reference to the new table header was added by updating the anchor point to point to the new header object). The cloned page vector 414 can store handles to at least five pages and so, with reference to diagram 400J of FIG. 4J, the fifth page $410_5$ is linked to the cloned page vector object 414. The reader 412, with reference to the diagram 400J of FIG. 4J can still read data stored in any of the first four pages $410_1 \ldots 4$ using the old table header object 402. Concurrently, with reference to the diagram 400K of FIG. 4K, a sixth page $410_6$ can be added and linked to the cloned page vector object 414. When the reader 412 ends, with reference to FIG. 4K, the original table header object 402 and the original page vector object 408 can be dropped because there are no further references to them.

As can be appreciated from the above, the affected data structure (i.e., the page vector object 412) is cloned and all the objects (e.g., the table header object 402) on the path from the anchor object 404 to the modified object are cloned. A clone can be considered a shallow copy of the object. Only new versions of child objects (in this case a new, resized vector) will be anchored in its parent's clone, other child objects will just increment their respective reference count (not shown in figures). After the cloning is done, the anchor pointer is updated to point to the newly-cloned root object (in this case table header object).

A reader can increment reference count on the root object of the object hierarchy (in the current example table header object). This versioning forces holding of the old version of the data in memory (as opposed to having the database overwrite such version), even though concurrent modifications have done incompatible structural changes.

In addition, because the database is using MVCC to access database table data, it can read the same data set from both old as well as new data structures. In the above example, data written to new pages is not visible to the running transaction of the reader, so it is irrelevant that the reader cannot read them. Similarly, compatible changes adding new data to existing pages are also invariant for the reader, because it will only see its old data. Care must be only taken to order writes and reads in such a way as to ensure consistent dirty read of internal structures (such as, write to the vector first writes new element and then increases element count, reader OTOH first reads count, then accesses elements). If the writer first increases element count and then writes the element, the reader would have a race condition: it could already read new element count and access the not-yet-written element (un-initialized memory), which typically leads to a crash and/or incorrect results.

In order to ensure L2-cache friendliness, the anchor pointer object can contain a reference count of the root object and root object pointer separately for each CPU core. Thus, the reader only modifies core-private cache line using an atomic operation to increase reference count and at the same time reads the current anchor pointer. When an incompatible structural change happens, reference counts of all core-private counters can be aggregated one-by-one to the reference count of the root object and the anchor pointer object updated atomically to contain new root pointer and zero reference count (eventually repeating the operation in case of collision with a reader). Reader leaving an out-of-date structure (different anchor pointer) then needs to atomically decrement shared reference count in the old version of the root object (in our example, table header object) instead of the reference count in the core-private cache line of the anchor pointer.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A method comprising:
   initiating at least one read operation of at least one object of an object graph, the object graph characterizing a hierarchy of objects stored within an in-memory database that includes a root object, at least a portion of the nodes having corresponding reference counts specifying a number of edges pointing to the associated object, wherein compatible changes can be made to objects in the graph and incompatible changes can be made to objects in the graph;
   incrementing, for each corresponding read operation, a reference count of the root object, the reference count for the root object initially reflecting an anchor pointer pointing to the root object;
   changing one or more objects;

cloning the root object, at least one changed object, and any intervening objects within the hierarchy of objects if incompatible changes have been made to the at least one changed object to accommodate for such incompatible changes, the cloning creating new edges between affected objects and new edges between newly cloned objects and originally linked objects from old versions of the at least one changed object;

linking the anchor pointer to the cloned root object;

dropping the root object when the reference count for the root object is zero;

traversing the object graph starting at the root object and ending at the at least one changed object removing any edges for such objects; and dropping each object when its corresponding reference count becomes zero;

wherein:
the database stores data in rows with monotonically-increasing row identifiers;

the database uses multi-version concurrency control for transaction isolation and consistent reading such that, when a new version of a record is created, the new version of the record is given a new row identifier and old versions of the record are maintained for parallel readers and cleaned during a garbage collection process after committing.

2. A method as in claim 1, wherein the reference counts are striped across two or more CPUs.

3. A non-transitory computer program product storing instructions that, when executed by at least one programmable processor, cause the at least one programmable processor to perform operations comprising:

initiating a read operation of at least one page of a table stored in an in-memory database, the read operation using an anchor object pointing to a first table header object to access the at least one page, the first table header object including a link to a first linked object, the first linked object comprising a handle to a plurality of pages including the at least one page;

cloning the linked object and the table header object concurrently with the read operation, the cloned linked object comprising handles to the plurality of pages including the at least one page;

setting the anchor object to point to the cloned table header object;

linking at least one additional page to the cloned linked object; and dropping the first table header object and the first linked object after the read operation is completed wherein:
the database stores data in rows with monotonically-increasing row identifiers;

the database uses multi-version concurrency control for transaction isolation and consistent reading such that, when a new version of a record is created, the new version of the record is given a new row identifier and old versions of the record are maintained for parallel readers and cleaned during a garbage collection process after committing.

4. A computer program product as in claim 3, wherein the first linked object is a versioned object comprising a reference count, the reference count forcing the in-memory database to maintain the first table header object and the first linked object during the read operations.

5. A computer program product as in claim 4, wherein the reference counts are striped across two or more CPUs.

6. A computer program product as in claim 3, wherein the cloned table header object is initially linked to the first linked object.

7. A computer program product as in claim 3, wherein the first table header object has associated metadata characterizing the corresponding pages.

8. A computer program product as in claim 3, wherein the cloned table header object is also associated with the metadata associated with the first table header object.

9. A non-transitory computer program product storing instructions that, when executed by at least one programmable processor, cause the at least one programmable processor to perform operations comprising:

initiating at least one read operation of at least one object of an object graph, the object graph characterizing a hierarchy of objects stored in an in-memory database that includes a root object, at least a portion of the nodes having corresponding reference counts specifying a number of edges pointing to the associated object, wherein compatible changes can be made to objects in the graph and incompatible changes can be made to objects in the graph;

incrementing, for each corresponding read operation, a reference count of the corresponding object, the reference count of the root object initially reflecting an anchor pointer pointing to the root object;

changing one or more objects;

cloning the root object, at least one changed object, and any intervening objects within the hierarchy of objects if incompatible changes have been made to the at least one changed object to accommodate for such incompatible changes, the cloning creating new edges between affected objects and new edges between newly cloned objects and originally linked objects from old versions of the at least one changed object;

linking the anchor pointer to the cloned root object;

dropping the root object when the reference count for the root object is zero;

traversing the object graph starting at the root object and ending at the at least one changed object removing any edges for such objects; and dropping each object when its corresponding reference count becomes zero;

wherein:
the database stores data in rows with monotonically-increasing row identifiers;

the database uses multi-version concurrency control for transaction isolation and consistent reading such that, when a new version of a record is created, the new version of the record is given a new row identifier and old versions of the record are maintained for parallel readers and cleaned during a garbage collection process after committing.

10. A computer program product as in claim 9, wherein the reference counts are striped across two or more CPUs.

11. A computer program product as in claim 9, wherein the read operation comprises an incompatible change.

12. A system comprising:
at least one programmable processor; and
memory storing instructions, which when executed by the at least one programmable processor, result in operations comprising:

initiating a read operation of at least one page of a table stored in an in-memory database, the read operation using an anchor object pointing to a first table header object to access the at least one page, the first table header object including a link to a first linked object, the first linked object comprising a handle to a plurality of pages including the at least one page;
cloning the linked object and the table header object concurrently with the read operation, the cloned linked object comprising handles to the plurality of pages including the at least one page;
setting the anchor object to point to the cloned table header object;
linking at least one additional page to the cloned linked object; and
dropping the first table header object and the first linked object after the read operation is completed wherein:
the database stores data in rows with monotonically-increasing row identifiers;
the database uses multi-version concurrency control for transaction isolation and consistent reading such that, when a new version of a record is created, the new version of the record is given a new row identifier and old versions of the record are maintained for parallel readers and cleaned during a garbage collection process after committing.

13. A system as in claim 12, wherein the first linked object is a versioned object comprising a reference count, the reference count forcing the in-memory database to maintain the first table header object and the first linked object during the read operations.

14. A system as in claim 13, wherein the reference counts are striped across two or more CPUs.

15. A system as in claim 12, wherein the cloned table header object is initially linked to the first linked object.

16. A system as in claim 12, wherein the first table header object has associated metadata characterizing the corresponding pages.

17. A system as in claim 12, wherein the cloned table header object is also associated with the metadata associated with the first table header object.

18. A system comprising:
at least one programmable processor; and
memory storing instructions, which when executed by the at least one programmable processor, result in operations comprising:
initiating at least one read operation of at least one object of an object graph, the object graph characterizing a hierarchy of objects stored in an in-memory database that includes a root object, at least a portion of the nodes having corresponding reference counts specifying a number of edges pointing to the associated object, wherein compatible changes can be made to objects in the graph and incompatible changes can be made to objects in the graph;
incrementing, for each corresponding read operation, a reference count of the corresponding object, the reference count of the root object initially reflecting an anchor pointer pointing to the root object;
changing one or more objects;
cloning the root object, at least one changed object, and any intervening objects within the hierarchy of objects if incompatible changes have been made to the at least one changed object to accommodate for such incompatible changes, the cloning creating new edges between affected objects and new edges between newly cloned objects and originally linked objects from old versions of the at least one changed object;
linking the anchor pointer to the cloned root object;
dropping the root object when the reference count for the root object is zero;
traversing the object graph starting at the root object and ending at the at least one changed object removing any edges for such objects; and
dropping each object when its corresponding reference count becomes zero;

wherein:
the database stores data in rows with monotonically-increasing row identifiers;
the database uses multi-version concurrency control for transaction isolation and consistent reading such that, when a new version of a record is created, the new version of the record is given a new row identifier and old versions of the record are maintained for parallel readers and cleaned during a garbage collection process after committing.

19. A system as in claim 18, wherein the reference counts are striped across two or more CPUs.

20. A system as in claim 18, wherein the read operation comprises an incompatible change.

* * * * *